United States Patent [19]
Rigney

[11] Patent Number: 6,083,392
[45] Date of Patent: Jul. 4, 2000

[54] RIBBED FUNNEL

[75] Inventor: Donald P. Rigney, Belleville, Ill.

[73] Assignee: Empire Comfort Systems, Inc., Belleville, Ill.

[21] Appl. No.: 09/112,603

[22] Filed: Jul. 9, 1998

[51] Int. Cl.$^7$ .................................................. B01D 29/085
[52] U.S. Cl. ..................... 210/451; 210/477; 210/481; 210/497.3; 210/499; 210/455
[58] Field of Search ................. 210/451, 455, 210/476, 473, 477, 497.3, 498, 499, 481; D7/700; 141/331, 300, 297, 310; 73/294; 99/306; 422/99

[56] References Cited

U.S. PATENT DOCUMENTS

| | | | |
|---|---|---|---|
| 407,253 | 7/1889 | Sautter | 210/455 |
| 435,096 | 8/1890 | Hoops, Jr. | 210/455 |
| 491,421 | 2/1893 | Gersdorff | 141/297 |
| 616,224 | 12/1898 | Cullison | 210/314 |
| 637,285 | 11/1899 | Riedel et al. | 210/455 |
| 865,572 | 9/1907 | Dawson | 210/455 |
| 987,360 | 3/1911 | Harrington . | |
| 2,234,397 | 3/1941 | Bentz | 210/477 |
| 3,334,574 | 8/1967 | Douglas | 99/304 |
| 4,149,454 | 4/1979 | Kemp . | |
| 4,159,954 | 7/1979 | Gangemi . | |
| 4,229,306 | 10/1980 | Hein et al. . | |
| 4,642,190 | 2/1987 | Zimmerman . | |
| 4,765,896 | 8/1988 | Hartley et al. | 210/474 |
| 5,290,444 | 3/1994 | Campbell | 210/473 |
| 5,503,740 | 4/1996 | Callaghan et al. . | |

FOREIGN PATENT DOCUMENTS 400077  3/1933  United Kingdom .

Primary Examiner—W. L. Walker
Assistant Examiner—Terry K. Cecil
Attorney, Agent, or Firm—Howell & Haferkamp, L.C.

[57] ABSTRACT

A funnel having at least one channel or groove formed by projected ribs in the sidewalls of the funnel. The projections space the sides of a filter membrane placed inside the funnel, thereby preventing the sides of the filter insert from adhering to the sidewalls of the funnel and allowing the fluid to flow through the sides of the filter insert and into the grooves or channels that conduct the fluid to the discharge orifice of the funnel. The projected ribs are preferably a plurality of raised ribs arranged at approximately 45 degree intervals about the funnel interior surface.

26 Claims, 4 Drawing Sheets

RIBBED FUNNEL

BACKGROUND OF THE INVENTION

This invention relates to funnels in general, and specifically to funnels that are used with cloth and/or paper inserts to filter the liquid poured inside the funnel.

The convenience and advantages of using paper and cloth filters with funnels has been widely recognized. In combination with funnels, these type of filter inserts provide an inexpensive and relatively maintenance free filter unit. The filter inserts are periodically replaced with fresh new filters, and the old filters are frequently discarded, or in some cases, washed or cleaned and reused. As a funnel typically lasts for many years and filter inserts are in ample supply, this type of filter assembly has become a desirable commodity, and consequently have become commercially popular. While their use is especially well known in the coffee industry, this filter assembly is useful in other fields as well, such as in the filtering of cooking oil for reuse.

The combination of cloth or paper filter inserts and funnels, however, does not come without a major drawback: the inserts tend to stick to the sides of the funnel. This has several undesirable effects. For instance, the portions of the filter insert that adhere to the sides of the funnel are incapable of filtering any liquid through the sides of the filter insert. Therefore, any filtering that occurs as the liquid passes through the filter insert is at the bottom of the insert where the fluid may flow unobstructedly through the filter insert and out the funnel exit orifice. Thus, most of the filtering capacity of the funnel is compromised when the sides of the filter inserts stick to the funnel. As a result, the rate of liquid flow through the filter insert is relatively slow, and the amount of time needed to filter a liquid is relatively large. The adherence of the inserts to the walls of the funnel also makes it difficult to remove the insert for cleaning or to replace it with another one.

Various types of funnel construction have been proposed in the art to overcome this problem. For example, U.S. Pat. No. 4,765,896 teaches the use of stepped concentric sidewalls and wire baskets with funnels to keep a filter insert from adhering to the sides of the funnel. While some success has been achieved by the use of stepped concentric sidewalls and wire baskets in preventing adherence of a filter insert to the sidewalls of a funnel, this construction accomplishes little toward increasing the rate of liquid flow through the filter insert and out of the funnel. That is because the stepped concentric sidewalls tend to trap the fluid after it flows through the filter.

This trapping of the fluid between the steps of the sidewalls or wire baskets and a filter insert has several consequences. First, some of the filtered fluid flows back through the filter and eventually is filtered again as it passes through the bottom of the filter. This double filtering of the fluid is an unnecessary waste of the capacity of the filter as well as an unnecessary increase in valuable time. Second, some of the liquid that is trapped between the filter insert and the sidewalls of the funnels of the prior art remains trapped until the filter insert is removed. Consequently, the filter insert is often dripping wet when it is removed and replaced, and the trapped fluid often splashes down into and through the funnel. Aside from creating a mess, this effectively wastes a portion of the filtered fluid. Third, depending on the frequency of use of the funnel, the liquid being filtered, and how long the liquid is trapped, sediment from the trapped liquid may buildup in the funnel over time. This build up is likely to be unclean, unsightly, and difficult to remove.

The funnels of the prior art are therefore disadvantageous when used with filter inserts because they lead to inefficient double filtering of the fluid poured into the filter insert, increase the amount of time necessary to filter a liquid through the funnel, waste some portion of filtered fluid over the course of time, and render a funnel unsightly and difficult to clean and maintain during extended use of the funnel.

SUMMARY OF THE INVENTION

Among the several advantages of the present invention may be noted the provision of a funnel that prevents a filter insert from adhering to the sides of a funnel; the provision of a funnel that increases the filtration rate of a fluid through a filter insert placed in the funnel; the provision of a funnel that directs a filtered liquid passing through a filter insert to the outlet of the funnel cleanly and efficiently; and the provision of a funnel with a removable filter screen for the bottom of the funnel.

Generally, the funnel of the present invention comprises a funnel having an overflow chamber with a receiving end, a dispensing end, and an interior surface. The interior surface of the overflow chamber has at least one, but preferably a plurality, of projections that are configured to prevent a filter insert from adhering to the sides of the funnel. The projections help form a plurality of channels to direct a filtered fluid that passes through the sides of a filter insert placed in the funnel toward the dispensing end of the funnel.

The projections on the interior surface of the funnel comprise elongated ribs extending linearly and generally vertically from the top of the funnel to the bottom. The ribs are preferably tapered in height relative to the interior surface of the funnel so as to be taller near the top end of the funnel than at the bottom end. Flanges connect the ribs at the top and bottom of the funnel, respectively.

The projections prevent the trapping of fluid between the walls of the funnel and the paper inserts by providing a clear path or channel to the bottom of the funnel once the liquid passes through the sides of the filter insert. When a filter insert is placed into the funnel, the ribs contact the filter and create generally vertically extending channels between the filter and the filter sidewall. Consequently, liquid poured into the filter insert may flow through the channels as well as the bottom, thereby vastly increasing the surface area of filtration and significantly reducing the time needed for the fluid to flow through the filter.

Further, the ribs have sloped sides and therefore no sharp angled transition where fluid may be trapped, which instead direct filtered fluid away from the ribs and into the channels where the filtered liquid may be discharged from the funnel.

In another aspect of the invention, the funnel contains a removable filter screen. The screen is a thin metallic disk configured to rest between the ribs in the bottom of the funnel and cover the discharge orifice or outlet of the funnel. The disk has a plurality of apertures so that the fluid in the funnel may flow through it. The filter screen may be used in connection with a filter insert or as a separate stand-alone filter for the funnel. The filter screen is removable for easy cleaning of the screen and the funnel.

In another aspect of the invention, the funnel comprises an overflow chamber having a receiving end, a dispensing end, an internal surface and a discharge orifice. The interior surface of the overflow chamber has at least one, but preferably a plurality of linear grooves, so that when a filter insert is placed into the overflow chamber the liquid filtered through the membrane is conducted to the outlet orifice. The grooves have sloped sides to help draw filtered fluid away from the filter insert, and the grooves are themselves sloped relative to the internal surface of the overflow chamber. Again, a filter screen as described above may be used with the funnel, with or without a filter insert.

Thus, the funnel of the present invention provides a plurality of generally vertically extending channels or grooves between the filter and the funnel so that fluid may be filtered along substantially the entire height of the filter and readily drained toward the funnel exit orifice. The present invention therefore presents a cleaner, more efficient, and convenient funnel to be used for filtering purposes than the funnels of the prior art.

Other objects and features of the invention will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
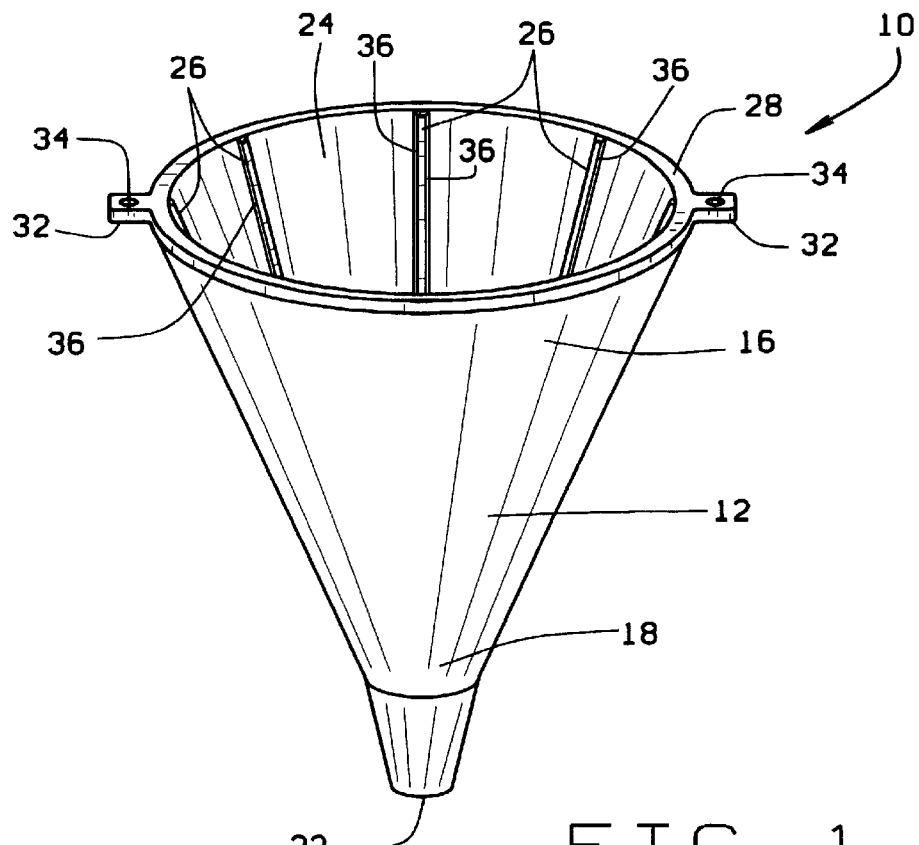
FIG. 1 is a perspective view of the funnel of the present invention.
Figure 2:
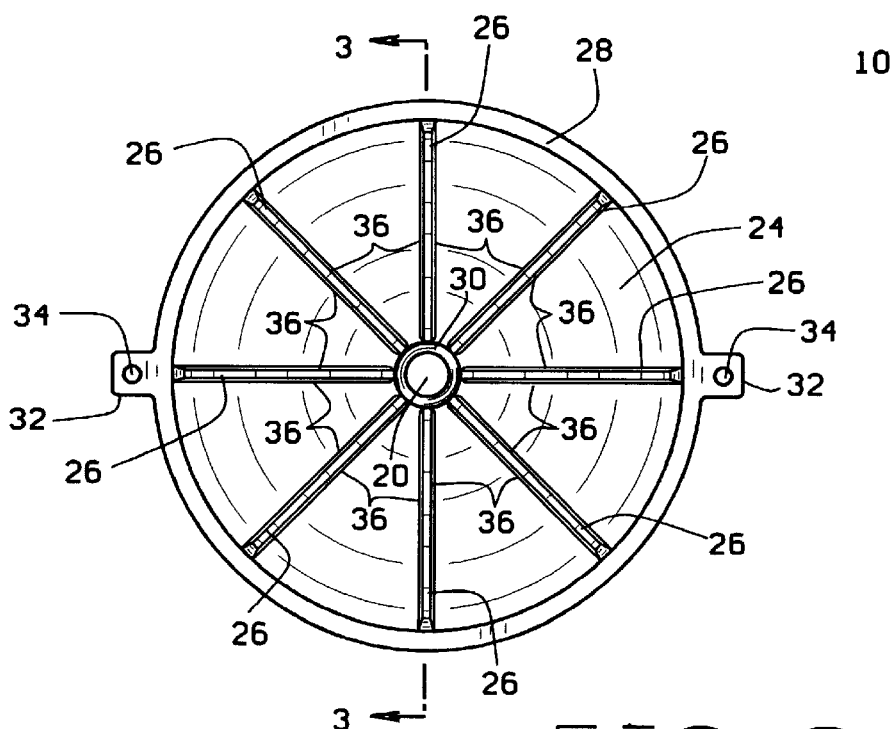
FIG. 2 is a top view of the funnel of the present invention.
Figure 3:
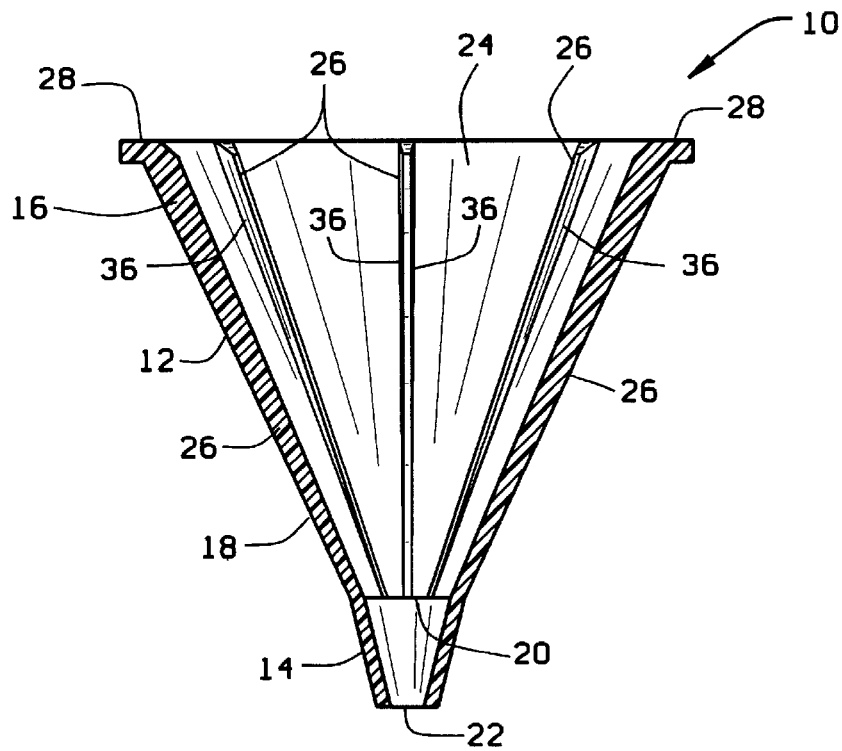
FIG. 3 is a cross-sectional view of the present invention taken along the plane of line 3—3 in FIG. 2.

Referring now to the drawings, and specifically to FIGS. 1–3, the funnel of the present invention is indicated generally by the reference numeral 10. As is best seen in FIG. 1, the funnel comprises an overflow chamber 12 and a spout 14. The overflow chamber 12 and the spout 14 may be made of any suitable material, but plastic or rubber is preferred due to the light weight and anti-corrosive properties of those materials. The overflow chamber 12 and the spout 14 may be integrally formed, or may consist of two or more parts, which may or may not be separable. Also, the shape of the spout may vary for specific applications, and for the same reason the spout 14 may be connected at an angle relative to the overflow chamber 12.

For illustrative purposes, the funnel 10 shown and described herein is generally conical in shape and circular in cross-section. While the conical and symmetrical shape shown and herein described is preferred, other shapes of the funnel, whether symmetrical or asymmetrical, may be desirable in certain circumstances and for particular uses.

The overflow chamber 12 has a receiving end 16 and a dispensing end 18. The receiving end 16 is substantially larger in diameter than the dispensing end 18 to allow for easy pouring or otherwise placing of liquid, or other material into the funnel. The receiving end 16 corresponds to the top end of the funnel in use and the dispensing end 18 corresponds to the bottom end of the funnel in use.

At the dispensing end 18 of the funnel 10 is a discharge orifice 20 (see FIG. 3), which may alternatively be characterized as an inlet for the spout 14. The spout 14 is hollow and forms a chute for fluid to flow through, ultimately discharging the contents of the funnel through the outlet port 22. The spout 14 is wider at the inlet 20 than at the outlet port 22 and is sloped in between to accommodate a wide variety of containers to which the funneled fluid may be directed. The outside of the spout may also be configured with threads and the like for secure attachment to a container.

The overflow chamber 12 is defined by an interior surface 24 that temporarily stores the fluid placed into the funnel 10 when the rate of liquid flow into the overflow chamber 12 is greater than the rate of liquid flow through the outlet port 22 of the spout 14. The interior surface 24 is configured with at least one projection in the form of an elongated rib 26. While a plurality of ribs is preferred, it is recognized that a single spiraling rib may be utilized to practice the invention. Further, while the projections 26 are preferably continuous ribs, other forms of projections may suffice to accomplish the function of the present invention.

The ribs 26 extend linearly between the receiving end 16 and the dispensing end 18 of the overflow chamber 12. As shown in FIG. 2, the raised ribs are arranged in the preferred embodiment at approximately 45 degree intervals about the interior surface 24. While linear ribs are preferred to ease the cleaning and drying of the funnel, curvilinear or even rectilinear ribs may be used without departing from the scope of the present invention. Likewise, the ribs 26 are preferably radial, but they need not be. For instance, spiraling ribs may accomplish the aims of the present invention. As is evident from FIG. 3, the ribs are preferably tapered and are larger near the receiving end 16 of the funnel 10 than at the dispensing end 16.

Upper and lower flanges 28, 30 encircle the receiving end 16 and the dispensing end 18 of the overflow chamber 12 and connect the ribs 26. Hold tabs 32 are provided on the upper flange 28, complete with mounting holes 34 to facilitate mounting of the funnel. Alternatively, the mounting holes 34 may be used to hang the funnel for storage.

The ribs 26 have opposite side edges 36 that are inclined or sloped relative to the interior surface 24 of the overflow chamber 12. In other words, the side edges 36 of the ribs 26 are oriented obliquely to the interior surface 24 of the overflow chamber 12. This configuration is preferred because the sloped sides avoid sharp corners that may trap liquid and that make the funnel difficult to clean and dry, but it should be recognized that other shapes of the ribs, including curved ones, would serve equally well.

Figure 4:
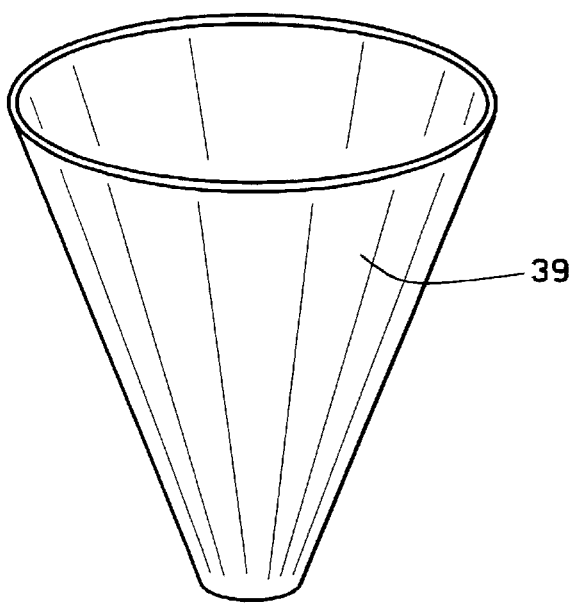
FIG. 4 is a perspective view of a filter membrane as may be used with the funnel of the present invention.

The ribs 26 prevent a filter insert 39 (see FIG. 4) from adhering to the interior surface 24 of the overflow chamber 12, at least adjacent the ribs 24, when the filter insert is placed into the overflow chamber. The filter insert may be any type of filter membrane known in the art. Preferably, the filter membrane is made of cloth or fabric and forms a sack that may be rinsed, washed, and/or cleaned and reused, but disposable filter membranes will work as well. To maximize the filtering capacity of the funnel, the filter membrane is preferably dimensioned to form a sack that fits inside and substantially covers the interior of the overflow chamber 12. It is recognized, however, that the filter membrane need not cover the entire interior of the overflow chamber, but rather only a part of it. This notwithstanding, the bottom of the filter membrane sack rests generally over the discharge orifice, and the sides of the filter membrane sack are spaced from the interior surface 24 of the overflow chamber 12 by virtue of the ribs 26.

The invention works as follows. A filter membrane is placed into the overflow chamber 12 so that the sides of the membrane rest on the plurality of ribs 26. As fluid is poured or otherwise placed into the filter membrane, the fluid flows through the filter membrane both through its bottom and through the sides of the filter membrane between the ribs 26. Depending on the size of the filter, and the relative viscosity and density of the fluid being filtered, the filter may adhere to the funnel interior at or near the middle portion thereof between adjacent ribs. However, the ribs will support the filter into a tent like configuration and thus form channels between the filter and the funnel on either side through which the filtered fluid may readily flow. Thus, the flow rate through the filter insert is appreciably increased, thereby significantly decreasing the time needed to filter a liquid. Depending on the tendency of the filter to adhere to the funnel, the liquid may flow through the sides of the filter membrane and down the inside of the overflow chamber 12 between the ribs and off the bottom of the filter membrane into the discharge orifice 20, or into the channels created between the sloped sides 36 of the ribs 26 the interior surface 24 of the overflow chamber 12, and the filter. The channels direct the filtered fluid to the discharge orifice 20 at the dispensing end 18 of the funnel 10. At the same time, fluid passing through the filter membrane through its bottom flows directly into the discharge orifice 20.

Thus, the present invention allows fluid to flow through a filter membrane through the bottom and the sides simultaneously, and because the ribs 26 extend vertically between the receiving end 16 and the dispensing end 18 of the funnel 10, gravitational forces are maximized in directing the fluid to the discharge orifice 20. The sloped sides 36 of the ribs 26 help to draw fluid away from the filter membrane and into the channels. Thus, nearly all of the fluid passing through the filter membrane passes through the discharge orifice 20 of the funnel 10 and thereafter through the outlet port 22 of the spout 14, where it may be retrieved for reuse. Consequently, the amount of fluid trapped inside the funnel is minimized which reduces the saturation of the filter membrane. When filtering is complete, the tapered ribs 26 facilitate easy removal and replacement of the filter membrane.

Thus, the present invention maximizes the flow rate through a filter insert, minimizes the time needed to filter a given amount of liquid, and is relatively clean and easy to maintain.

Figure 5:
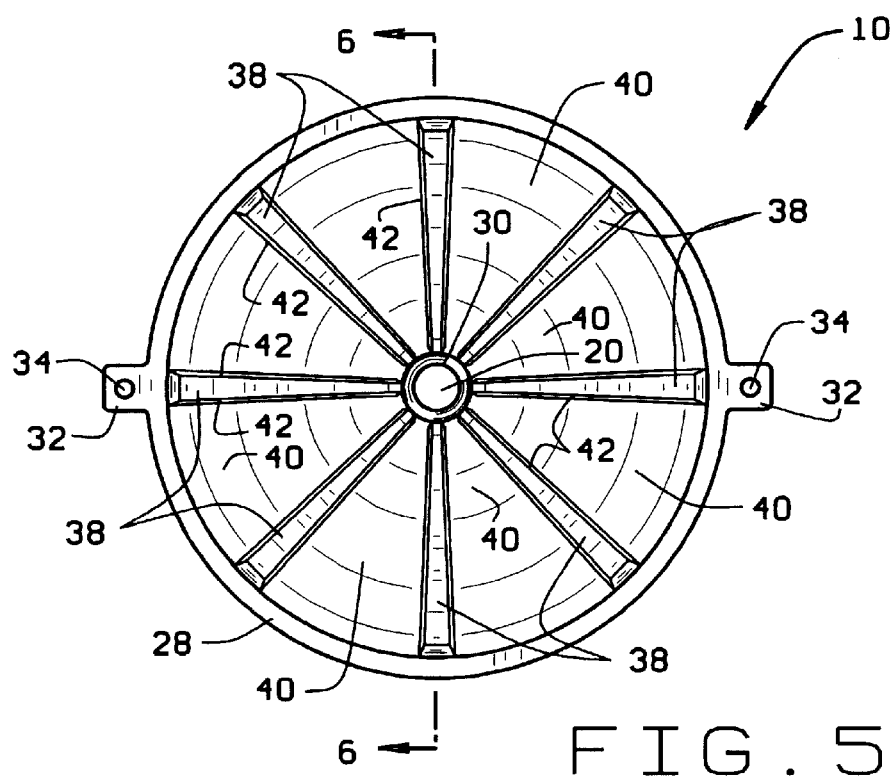
FIG. 5 is a top view of another embodiment of the present invention.
Figure 6:
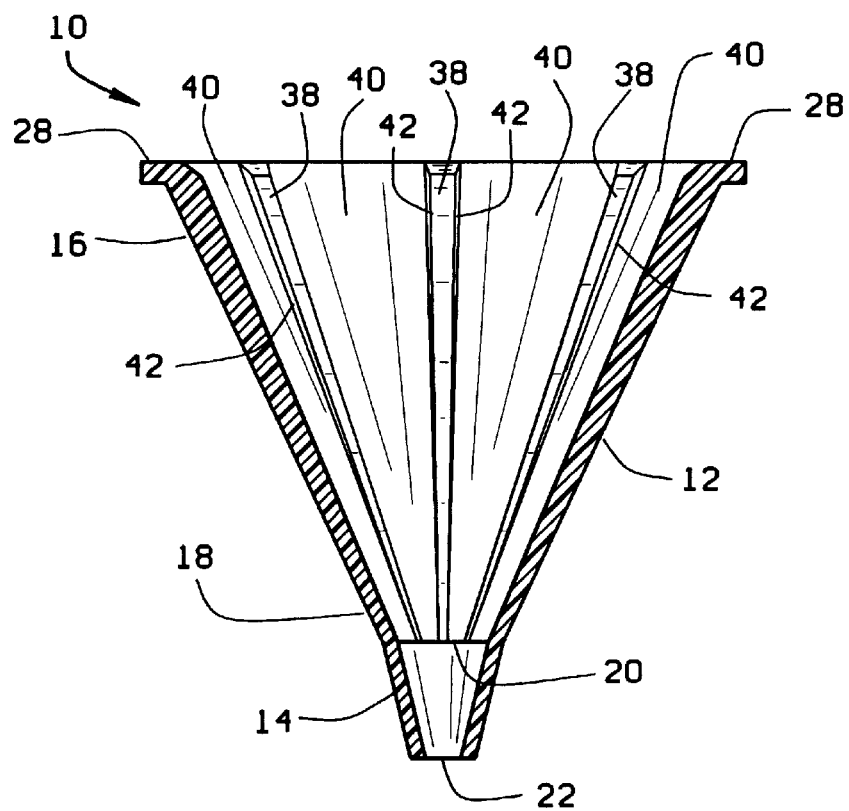
FIG. 6 is a cross-sectional view of the embodiment of FIG. 5 taken along with plane of line 6—6 in FIG. 5.

In another aspect of the invention, shown in FIGS. 5 and 6. The overflow chamber 12 has an internal surface 38 with at least one groove 40 configured to direct a fluid to the discharge orifice 20 of the funnel 10. While a plurality of grooves is preferred and hereinafter described to increase the efficiency of filtration and to reduce the time needed to filter a liquid, it is recognized that a single groove could be used, such as a spiraling groove. The grooves 40 have sloped sides 42 oriented at angles relative to the internal surface 38 of the overflow chamber 12 to draw fluid away from a filter membrance. The grooves 40 extend linearly between the receiving end 16 and dispensing end 18 of the overflow chamber 12.

As may be seen from FIG. 6, the grooves 40 are sloped relative to the internal surface 38 of the overflow chamber 12 to enhance the fluid flow in the grooves. While generally vertical linear grooves are preferred to maximize gravitational assistance in directing the fluid toward the discharge orifice 20, curvilinear or rectilinear grooves may likewise be used.

As before, upper and lower flanges 28, 30 encircle the receiving end 16 and the dispensing end 18. Likewise, holding tabs and mounting holes are provided in the upper flange. In operation, this embodiment functions nearly identically as described above, with the filter insert resting upon the internal surface 38 and the fluid flowing through the sides of the filter membrane into the grooves 40. Depending on the flow rate through the sides of the filter membrane, fluid passing through the sides of the membrane either flows in the grooves 40 to the discharge orifice 20 where the grooves end, or the fluid flows down the outside of the filter membrane adjacent the grooves and ultimately to the discharge orifice.

Figure 7:
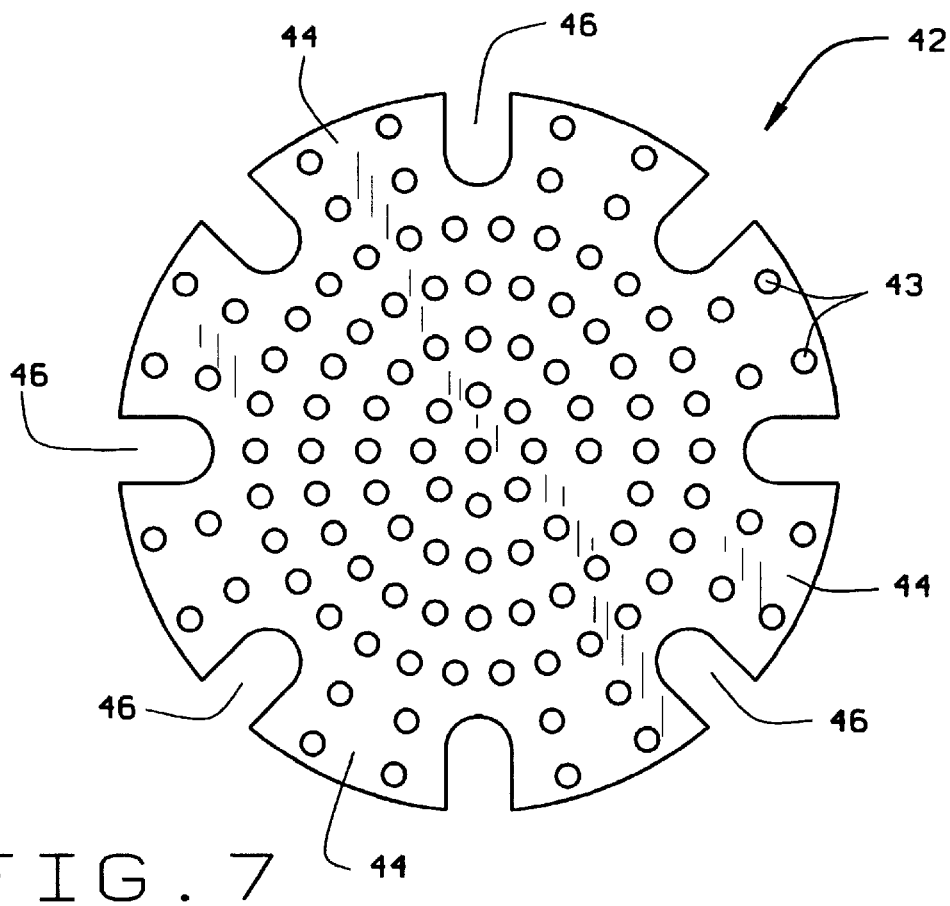
FIG. 7 is a top view of a filter screen for use with the present invention.

In another aspect of the invention, a filter screen 42 is provided as shown in FIG. 7. The filter screen 42 is generally disk-shaped and has a plurality of apertures 43 that filter liquid passing through the disk. Of course, it is readily appreciated that the number and size of the apertures may vary depending on the quality of filtration desired.

Figure 8:
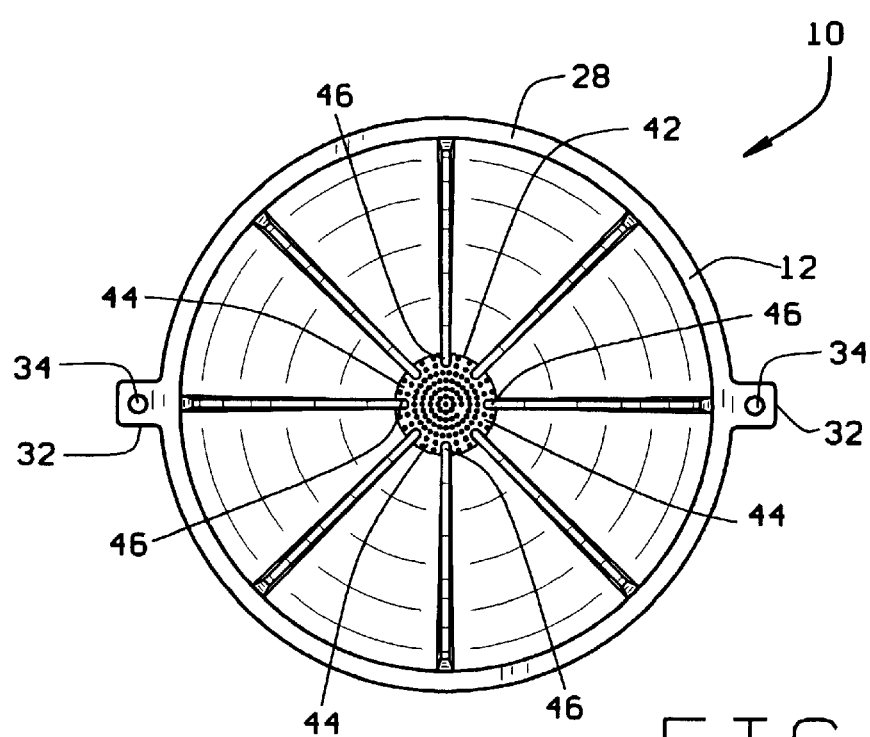
FIG. 8 is a top view of the present invention with the filter screen slipped inside and nestled near its bottom.

The filter screen is configured with tabs 44 separated by punches 46 along its perimeter. Referring now to FIG. 8, the tabs 44 rest between the ribs 26 of the overflow chamber 12 and the punches 46 wrap around the ribs 26. Alternatively, the tabs 44 rest in the grooves 40 and the punches 46 accommodate the internal surface 38 of the overflow chamber. While several tabs 44 or punches 46 are preferred in the filter screen 42, a single punch could wrap around one rib and the balance of the periphery of the filter screen may be circular and rest on the ribs 26, or a single tab could be inserted into one groove and the balance of the periphery of the filter screen may rest on the internal surface of the overflow chamber.

When the filter screen 42 is inserted into the overflow chamber 12 at the dispensing end 18, it rests over the discharge orifice 20, and therefore acts as a filter for the liquid passing through the funnel 10. The filter screen 42 could be used alone with the funnel 10, or it could be used in combination with a filter membrane insert. The filter screen 42 is also easily removable to facilitate cleaning of the funnel 10. While the screen is preferably separable from the funnel, it may be permanently mounted without departing from the scope of the present invention.

While the present invention has been described by reference to a specific embodiment, it should be understood that modifications and variations as would be apparent to one of ordinary skill in the art are within the scope of the invention which is limited solely by the claims and their equivalents. For example, one could consider the top surface of the ribs as forming the interior of the funnel, with the spaces therebetween then considered as grooves. In another example, the ribs could be formed by a series of continuous protuberances spaced sufficiently close together to support an adequate amount of filter, as desired. Still other arrays of protuberances could be used to form the ribs which, in turn, form the channels.

What is claimed is:

1. A funnel for use with a filter, the funnel having a height and a center axis and a sidewall having at least one sidewall structure for supporting a filter in a spaced apart relationship from the funnel and forming a channel extending over a substantial portion of the height of the funnel to thereby direct a fluid being filtered down the funnel and toward an exit orifice, said sidewall structure consisting of a plurality of raised narrow ribs spatially arranged at approximately 45 degree intervals around the funnel center axis and thereby forming a plurality of channels each having a width substantially greater than a width of any one of said ribs.

2. The funnel of claim 1 wherein each of said plurality of narrow ribs extend radially inwardly from a sidewall of said funnel to thereby form a plurality of raised ribs.

3. The funnel of claim 2 wherein each of said raised ribs is substantially continuous and has a vertical dimension.

4. The funnel of claim 3 wherein each of said raised ribs is substantially vertically oriented.

5. The funnel of claim 4 wherein each of said raised ribs has sides that are angled with respect to the funnel sidewall so as to form an oblique angle therewith.

6. The funnel of claim 2 farther comprising a filter screen, said filter screen having a perimeter shaped to match and line up with the interior of the funnel including the plurality of raised ribs and a plurality of orifices through which the fluid being filtered must pass to exit the funnel as the filter screen is resident in the funnel.

7. The funnel of claim 6, wherein said filter screen has a plurality of notches in its periphery to match and line up with the plurality of raised ribs so that the filter screen nestles into the funnel as the notches engage the raised ribs.

8. The funnel of claim 1 wherein each of said channels comprise a depression extending radially outwardly from a sidewall of said funnel.

9. The funnel of claim 8 wherein each of said depressions comprise a groove in the sidewall structure.

10. The funnel of claim 9 wherein each of said grooves is substantially vertically oriented.

11. The funnel of claim 10 wherein each of said grooves has opposite sides that are angled with respect to the funnel sidewall so as to form an oblique angle therewith.

12. The funnel of claim 8 further comprising a filter screen, said filter screen having a perimeter shaped to match and line up with the interior of the funnel including the depressions, and a plurality of orifices through which the fluid being filtered must pass to exit the funnel as the filter screen is resident in the funnel.

13. The funnel of claim 12 wherein said depressions comprise a plurality of grooves, and wherein the filter screen has a plurality of tabs in its periphery to match and line up with the plurality of grooves so that the filter screen nestles into the funnel as the tabs engage the grooves.

14. A funnel and filter combination for filtering a fluid, the funnel having a center axis and a sidewall, said sidewall having a filter support consisting of a plurality of raised narrow ribs spatially arranged at approximately 45 degree intervals around the funnel center axis and extending substantially vertically along an interior sidewall of the funnel, the filter being sized to be substantially supported by the raised ribs as it is inserted into the funnel to thereby form a plurality of channels between the ribs and the filter, said channels thereby extending substantially vertically to guide the filtered fluid downwardly through the funnel, and said channels each having a width substantially greater than the width of any one of said ribs.

15. The funnel and filter combination of 14 wherein said raised ribs extend substantially along the entirety of the funnel.

16. The funnel and filter combination of claim 15 further comprising a filter screen, said filter screen having a plurality of notches spaced along its periphery to match and line up with the raised ribs so that the filter screen will nestle into the bottom of the funnel as it is placed therein, said filter screen having a plurality of holes through which a fluid may pass to thereby be filtered.

17. A funnel and filter combination for filtering a fluid, the funnel having a center axis and a filter support consisting of a plurality of wide grooves defined by a plurality of raised ribs, each substantially narrower than the width of any one of said grooves, spatially arranged at approximately 45 degree intervals around the funnel center axis and extending substantially along an interior sidewall of the funnel, the filter being sized to be substantially supported by the raised narrow ribs as it is inserted into the funnel, the wide grooves forming a plurality of wide channels between the raised narrow ribs and the filter, said channels thereby extending substantially vertically to guide the filtered fluid downwardly through the funnel.

18. The funnel and filter combination of claim 17 wherein said grooves extend substantially along the entirety of the funnel.

19. The funnel and filter combination of claim 18 further comprising a filter screen, said filter screen having a plurality of tabs spaced along its periphery to match and line up with the grooves so that the filter screen will nestle into the bottom of the funnel as it is placed therein, said filter screen having a plurality of holes through which a fluid may pass to thereby be filtered.

20. A funnel having a height and a center axis and a shaped sidewall comprised of a plurality of spaced supports, said plurality of spaced supports consisting of raised continuous structural elements spatially arranged at approximately 45 degree intervals around the funnel center axis and extending substantially the height of the funnel sidewall so that as an appropriately sized filter is placed therein, said spaced supports support said filter so that channels are formed between the filter and the funnel, said channels being substantially wider than the width of said spaced supports and having a general downward orientation so that any fluid that enters the channels will be directed downwardly through the funnel.

21. The funnel of claim 20 wherein the continuous structural elements are raised ribs extending substantially vertically along the funnel sidewall.

22. The funnel of claim 21 wherein each of the raised ribs forms a channel on each side thereof and between the funnel and filter as the filter is supported by each raised rib.

23. The funnel of claim 22 wherein the raised ribs are oriented to extend at a slope relative to the funnel sidewall.

24. The funnel of claim 20 wherein the channels are grooves in the sidewall of the funnel.

25. The funnel of claim 24 wherein the grooves extend substantially vertically along the funnel sidewall.

26. The funnel of claim 25 wherein said grooves are oriented to extend at a slope relative to the funnel sidewall.

* * * * *